(12) United States Patent
Vorderwisch

(10) Patent No.: US 11,649,844 B2
(45) Date of Patent: *May 16, 2023

(54) PLASTIC THREAD ELEMENT AND CONNECTION ASSEMBLY CONSISTING OF A PLASTIC CARRIER PART AND A PLASTIC THREAD PART

(71) Applicant: Böllhoff Verbindungstechnik GmbH, Bielefeld (DE)

(72) Inventor: Alexander Vorderwisch, Steinhagen (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 328 days.

This patent is subject to a terminal disclaimer.

(21) Appl. No.: 17/083,805

(22) Filed: Oct. 29, 2020

(65) Prior Publication Data

US 2021/0040975 A1    Feb. 11, 2021

Related U.S. Application Data

(63) Continuation of application No. 16/074,480, filed as application No. PCT/EP2017/051918 on Jan. 30, 2017, now Pat. No. 10,851,824.

(30) Foreign Application Priority Data

Feb. 3, 2016 (DE) ............................. 102016101910

(51) Int. Cl.
*F16B 25/00* (2006.01)

(52) U.S. Cl.
CPC ...... *F16B 25/0015* (2013.01); *F16B 25/0052* (2013.01); *F16B 25/00* (2013.01)

(58) Field of Classification Search
CPC .. F16B 25/00; F16B 25/0015; F16B 25/0031; F16B 25/0052; F16B 25/0073
USPC ......... 411/411, 412–413, 417–418, 904, 908
See application file for complete search history.

(56) References Cited

U.S. PATENT DOCUMENTS

| | | | | |
|---|---|---|---|---|
| 2,352,982 A | * | 7/1944 | Tomalis | F16B 25/0047 470/204 |
| 3,911,781 A | * | 10/1975 | Bappert | F16B 13/02 411/386 |
| 4,003,287 A | * | 1/1977 | Ziaylek, Jr. | F16B 37/127 411/968 |
| 4,637,767 A | * | 1/1987 | Yaotani | F16B 25/0047 411/386 |
| 4,826,379 A | * | 5/1989 | Norden | F16B 37/0842 411/908 |
| 5,110,245 A | * | 5/1992 | Hiroyuki | F16B 25/0047 411/417 |

(Continued)

*Primary Examiner* — Roberta S Delisle
(74) *Attorney, Agent, or Firm* — Reising Ethington P.C.; Matthew J. Schmidt

(57) ABSTRACT

A thread element mode of plastic, a connection assembly consisting of a support part made of plastic into which the thread element made of plastic has been screwed by creating a counter-thread, a method for manufacturing the connection as well as a method for manufacturing the thread element. The thread element is characterized by an axial piece on which the circumferential windings of a thread turn are interrupted by at least two chip flutes. The resulting winding areas form a cutting web and an inhibition web, whereby the cutting web extends radially beyond the inhibition web.

17 Claims, 9 Drawing Sheets

(56) References Cited

U.S. PATENT DOCUMENTS

2008/0213065 A1\* 9/2008 Sussenbach ............ F16B 25/10
411/411
2012/0014764 A1\* 1/2012 Davidson .............. F16B 37/002
411/437

\* cited by examiner

PLASTIC THREAD ELEMENT AND CONNECTION ASSEMBLY CONSISTING OF A PLASTIC CARRIER PART AND A PLASTIC THREAD PART

REFERENCE TO CO-PENDING APPLICATION

This application is a continuation of U.S. patent application Ser. No. 16/074,480 filed on Aug. 1, 2018, which is a National Phase Application of PCT/EP2017/051918 filed on Jan. 30, 2017, and claims the benefit of German Application No. DE102016101910.0 filed on Feb. 3, 2016. The entire contents of these priority applications are incorporated herein by reference in their entireties.

TECHNICAL FIELD

The present disclosure relates to a thread element made of plastic, in particular a plastic screw, a plastic thread bushing with an inner thread and a plastic thread insert, a connection assembly consisting of a plastic support part with a receiving opening, in which the thread element has been screwed while forming a thread in a self-acting manner, and a method for manufacturing the connection assembly from the at least one plastic support part and the thread element made of plastic, as well as a method for manufacturing the thread element.

BACKGROUND

The above-mentioned connection assemblies consisting of at least one support part made of plastic and a plastic thread element in the form of a screw or a thread bushing with a self-forming outer thread are known in the prior art. They are described for example in DE 2 047 482 A1, U.S. Pat. Nos. 4,637,767, 5,921,735, 5,385,439 and DE 10 2004 021 484 A1.

U.S. Pat. No. 5,385,439 describes a screw, on the shaft of which an outer thread is arranged. Form elements are provided on individual turns of the threading of this screw. These form elements extend in radial direction and/or axial direction beyond the geometric dimensions of the adjacent turn of the threading. In this way, they form a counter-thread, for example in a support part, particularly when the forming elements are arranged in the first turns near the tip region of the screw of the threading.

U.S. Pat. No. 5,921,735 describes a screw, the shaft of which is also provided with an outer thread. This outer thread is characterized by four different thread zones distributed over the length of the screw on the shaft. By changing the cross-sectional form of the shaft and the thread arranged on it, a retaining zone, various thread forming zones as well as an alignment zone within the outer thread of the screw can be realized.

U.S. Pat. No. 4,637,767 also describes a screw with an outer thread, wherein the individual turns of the threading are provided with cam-shaped radial cutting projections. These projections support the forming of a counter-thread into a component wall. At the same time, however, these projections also provide a rotation inhibition which supports the hold of the screwed-in threaded element in the support component. The circumferentially freely distributed protrusions result in uneven torsional loads over the length of the screw shaft during the screwing-in of the thread element into the support component. These different torsional loads can cause the thread element to fail.

DE 2 047 482 also describes a screw generating a thread. The screw shaft comprises five rounded corners into which the corresponding thread sections have been cut. Five relieving flattenings with incomplete threads are located between these thread sections. At the angular thread projections, the thread has its full depth, while the depth in the flat sections is substantially lesser. The flattened relief areas between the corner areas with threads serve to accommodate abrasive material so that the screw can move freely.

DE 10 2004 021 484 A1 describes a plastic thread element which comprises cutting edges and an adjacent chip flute. In order to create this specific cutting geometry of the thread profile, the thread element consists of several angular segments that are radially offset from one another in such a manner that respective adjacent angular segments form efficient cutting edges in the screwing-in direction. This means that the halves of the screw shaft or in general of the outer thread viewed in the axial sectional view are offset from one another in the radial direction in such a manner that the outer thread does not comprise a constant core diameter. This offset causes radially projecting cutting edges in the course of the thread or within a turn, which form a counter-thread in the support component. According to another alternative, notches have been cut from the circumferential turns of the threading so that their radial side forms a cutting edge for the forming of a counter-thread. However, this construction has the disadvantage that the screw-in torque is higher than the loosening torque due to the cutting edges in the screwing-in direction. Due to this constellation, a loosening of the thread element is generally facilitated.

It is therefore an object of at least some embodiments of the present invention to provide a thread element with an outer thread, a connection assembly consisting of at least one support part and this thread element, and a manufacturing method for the connection, which, compared to the prior art, provide an improved ratio between screwing-in torque and loosening torque, an improved torque course during screwing-in of the thread element into a component opening, and a greater tolerance between a diameter of the thread element and a diameter of the component opening receiving the thread element.

SUMMARY

The above object is solved in at least some embodiments by a thread element made of plastic, a connection assembly with at least one support part made of plastic and this thread element, by a method for manufacturing a connection assembly of at least one support part made of plastic and a thread element made of plastic as well as by a manufacturing method for a thread element made of plastic. Advantageous embodiments of the present invention as well as further developments become apparent from the following description, the accompanying drawings and the appending claims.

The thread element made of plastic comprises an axial piece with a central axis, and a thread turn circulating around the central axis in several windings as an outer thread. The outer thread is adapted to form a counter-thread when screwed into a receiving opening of a plastic support part, wherein a plurality of adjacent windings are interrupted by at least two chip flutes running parallel to the central axis at least over a part region of the axial piece, so that each interrupted winding comprises at least one cutting web and one inhibition web, wherein a radial extension of the cutting web is greater than a radial extension of the inhibition web, and a core thickness of the axial piece perpendicular to the central axis of the outer thread is constant at least in the part region of the axial piece outside of the longitudinal flutes. According to an embodiment, the cutting web and/or the inhibition web have a constant radius in their circumferential course. Further, a radius of the cutting webs and/or inhibition webs may change relative to the longitudinal direction of the thread element. In this way, the cutting depths of the cutting webs and/or the thickness of the press fit of the inhibition webs in the component can be specifically adjusted in relation to the axial length of the thread element. This allows a torsional load of the thread element to be distributed in axial direction onto the thread element.

The thread element consists of plastic and is configured specifically for being screwed into plastic support parts. For this purpose, the outer thread of the thread element is designed in such a manner that it creates a matching counter thread in a receiving opening of the support part. According to further embodiments, such thread elements made of plastic are designed as screws with a screw head and a screw tip or as thread bushings with an inner thread and the outer thread or with a through bore without thread or as thread bushings with any internal structure or as hollow screws with the outer thread, for example as a compression limiter.

The thread element comprises a thread turn which extends in several windings around the central axis of the thread element along the axial piece, for example the shaft of the screw. Here, a winding describes a 360° rotation of the thread around the central axis of the thread element. In order to create a matching counter-thread in the receiving opening of the support part made of plastic, at least a plurality of adjacently arranged thread turns are subdivided into at least two webs by chip flutes extending parallel to the central axis. These chip flutes may reach to the core thickness of the thread element, so that they subdivide the respective winding into at least two winding portions separated from each other. These winding portions form at least one cutting web and at least one inhibition web. The cutting web is characterized in that it projects in radial direction beyond the inhibition web. As the cutting web may be positioned prior to the inhibition web when viewed in the screwing-in direction of the thread element, it pre-forms a matching counter-thread in the support part made of plastic, while the subsequent inhibition web creates a matching press fit in the created counter-thread for fastening the thread element. With reference to the screwing-out direction of the thread element, the cutting webs may also act rotation inhibiting. In this way, they support the inhibition webs or compression webs which are equipped with a smaller diameter and engage elastically pushing into the pre-grooved coils of the counter-thread and in this way create a braking or inhibiting effect both during the screwing-in and the screwing-out of the thread element out of the receiving opening of the support part. With regard to an advantageous screwing-in, it may be preferred that a cutting resistance of the cutting web is set low and evenly. By this appropriate adjustment of the cutting resistance, a torsional load of the thread element is reduced. As the cutting web may remove material from the support part by cutting or scraping when the thread element is screwed into the component opening or when the matching counter-thread is created, this material may be collected in the chip flutes and discharged from the thread connection via the chip flutes. At the same time, however, it is also possible for material to be pushed on by the cutting webs without obstructing the creation of the matching counter-thread. Due to the constant core thickness, the thread element may be formed symmetrically apart from the cutting webs with a larger radius.

According to the disclosure, an even number of chip flutes may be in the thread element, such as two or four or six or eight chip flutes. These chip flutes extend parallel to the central axis of the axial piece as previously defined above. In accordance with the number of chip flutes, the respective winding is subdivided into a corresponding number of winding sections. These winding sections can be configured as a cutting web and/or inhibition web.

According to a further embodiment, the thread element comprises one, two or four cutting webs per winding, wherein in the case of more than one and an even number of cutting webs, these are arranged in pairs opposite one another. It may be further preferred to arrange three cutting webs spaced apart evenly along the circumference of the thread element.

According to the number of chip flutes mentioned above, which subdivide each respective winding in corresponding winding sections, the number of cutting webs and inhibition webs per winding is adjustable. In this way it is possible to adapt the torsional load of the thread element to the plastic of the thread element and/or to the plastic of the support part during rotation. If, for example, the torsional load on the thread element increases too much with only one cutting web per winding, it is necessary to provide an additional cutting web per winding. This cutting web supports the forming of the counter-thread and at the same time the reduction of the torsional load of the thread element in order to allow the plastic thread element to be screwed reliably and undamaged into the support part. Accordingly, a number of optimally adapted inhibition webs per winding also ensures a sufficient and reliable support of the thread element in the support part through the compressive stresses induced at the inhibition web between the support part and the thread element.

According to a further embodiment, the radial extension of the cutting web is 0.1 to 0.5 mm greater than the radial extension of the inhibition web of the winding. This geometry and dimensioning of the cutting web ensures a sufficient cutting effect and thus creation of the counter-thread in the support part. Furthermore, this dimensioning of the cutting web realizes a suitable preparation of the counter-thread for the press fit to be achieved between the support part and the thread element by means of the subsequent inhibition web. The effect of the cutting web may be supported by the fact that the radial outer side of the cutting web is sharp-edged, flattened or with an infinite radius of curvature. According to another embodiment, the effect of the inhibition webs is supported by the rounded radial outer side of the inhibition web.

According to another embodiment, the chip flutes interrupt the windings of the outer thread up to the core thickness of the thread element or beyond. This depth of the chip flutes is intended on the one hand to provide sufficient free space for the receiving of removed material. Furthermore, the depth of the chip flutes ensures that the lateral areas of the cutting webs and inhibition webs oriented in the circumferential direction of the thread element are fully available for the engagement with the material of the support part. In this way, the cutting web may develop its maximum possible cutting or notching or grooving effect during the screwing-in. In the same way, these lateral end faces of the cutting web and the inhibition web also prevent unscrewing if the thread element is loosened due to external influences on the connection between the support part and the thread element.

According to another embodiment, the cutting web comprises a circumferential extension with a starting point and an end point viewed in the screwing-in direction, wherein the radial extension of the cutting web is greater at the starting point than the radial extension of the cutting web at the end point. Due to this specific dimensioning of the cutting web, it comprises an inclination when viewed in the circumferential direction. With respect to turning the thread element in the screwing-out direction, the cutting web in this way develops a wedge effect which counteracts the screwing-out of the thread element from a receiving opening of the support part with inhibitory compressive stresses especially between the starting point of the cutting web and the wall of the counter-thread. It may be also preferred that the radial extension of the cutting web is the same at the starting point and the end point. According to another embodiment, cutting webs with a constant radius or with different radii are arranged on the thread element. It may be also preferred to arrange inhibition webs with a constant radius or with different radii on the thread element.

The present disclosure comprises a connection assembly with at least one support part made of plastic and the thread element made of plastic described above, which is screwed into a receiving opening of the support part.

The present disclosure also comprises a method for manufacturing the connection assembly from at least one support part made of plastic and a thread element made of plastic, which may be a thread element according to the embodiments described above, wherein the thread element comprises an outer thread and its support part comprises a receiving opening. The method comprises the following steps: axially screwing the thread element into the receiving opening, thereby forming a counter-thread in an inner wall of the receiving opening by means of a plurality of cutting webs in the outer thread and creating a press fit in the formed counter-thread by engagement of a plurality of inhibition webs which have a smaller radial extension than the cutting webs and which are arranged separately from the cutting webs via a plurality of chip flutes. This method may be complemented by the removal of material abrasion via the chip flutes, whereby the material abrasion occurs during the forming of the counter-thread.

The present disclosure further comprises a manufacturing method for the thread element made of plastic, which comprises the following steps: providing an injection mold formed complementary to the thread element, wherein the thread element comprises an axial piece having a central axis and a thread turn of an outer thread rotating around the central axis in several windings, and a plurality of adjacent windings are interrupted at least over a part region of the axial piece by at least two chip flutes extending parallel to the central axis, so that each interrupted winding comprises at least one cutting web and one inhibition web in which a radial extension of the cutting web is greater than a radial extension of the inhibition web, wherein a core thickness of the axial piece perpendicular to the central axis of the outer thread is constant at least in the part region of the axial piece outside the longitudinal flutes, injection molding the thread member and demolding the thread member from the injection mold. For a more detailed geometric design of the injection mold, it is referred to the above explanation of the thread element, as the injection mold—may be formed complementary to the geometric features of the thread element described there.

BRIEF DESCRIPTION OF THE DRAWINGS

The present disclosure is described further with reference to the detailed figures. It shows:

FIG. 3 is a sectional view along the line 3-3 from FIG. 2.

DETAILED DESCRIPTION

Figure 1A:
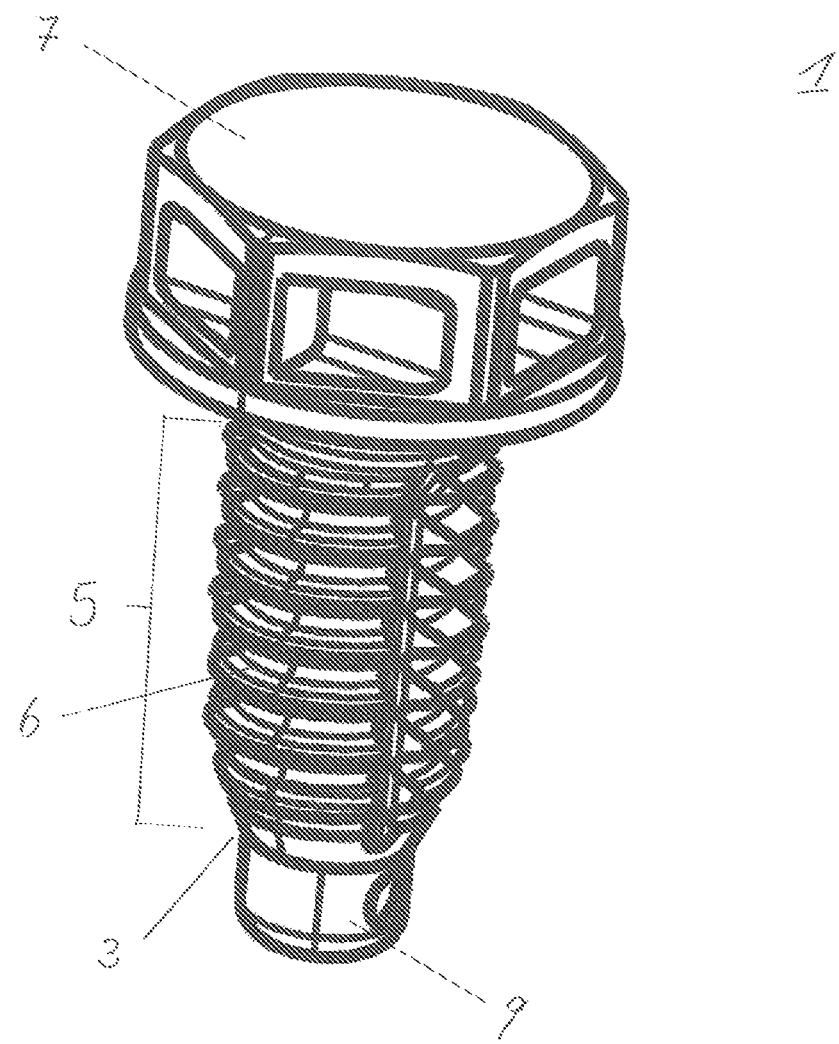
FIGS. 1A, 1B is an embodiment (1A) of a plastic thread and (1B) of a thread bushing or hollow screw with through bore.
Figure 1B:
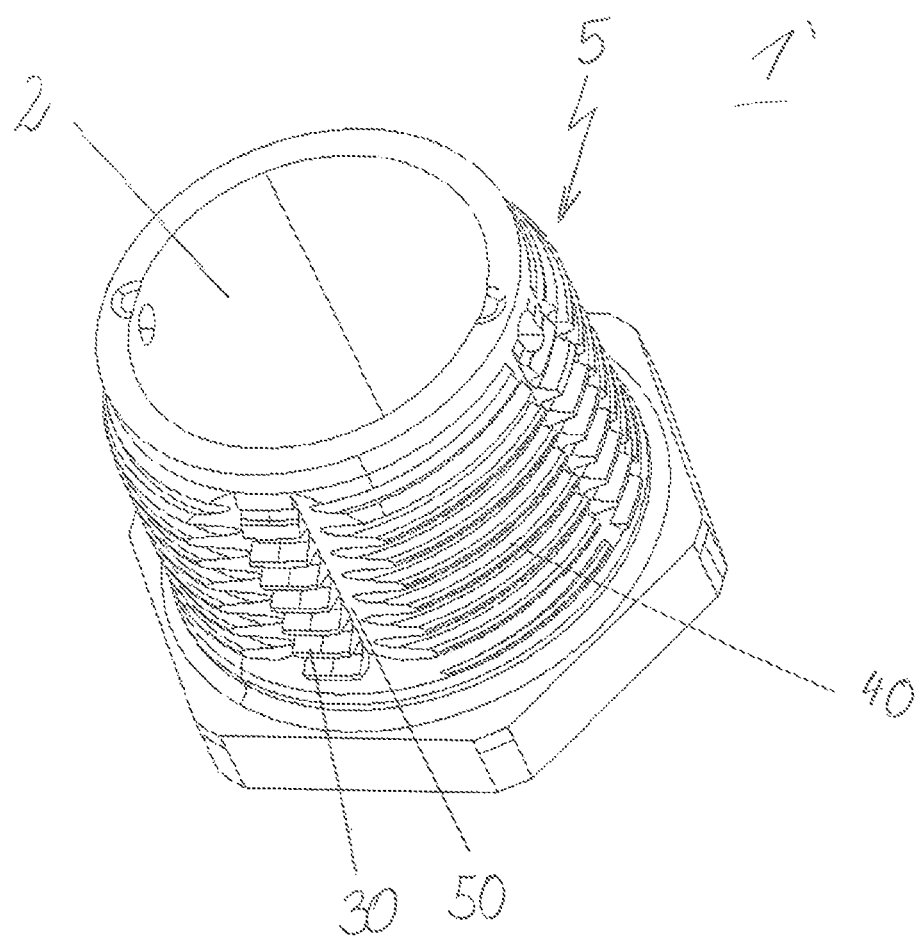

An embodiment of the thread element in form of a screw 1 made of plastic is shown in FIG. 1A. The thread element can also be realized as a thread bushing or thread insert 2 made of plastic, as it is shown in FIG. 1B.

An outer thread 5 of the plastic screw 1 or the plastic thread bushing 2 may be constructed in such a way that when penetrating into a receiving opening of a support part, it forms a counter-thread in its internal wall in an optimal manner. The counter-thread can be formed by a cutting process or by material deformation or by a combination of both processes.

The screw 1, which is shown as an example in FIG. 1, consists of a screw shaft 3 with a solid core and the outer thread 5 with a single thread turn 6, a screw head 7, a transition area 8 between the screw shaft 3 and the screw head 7, a drive means at the screw head 7 and a tip 9 at the end of the core or the screw shaft 3 of the screw 1 opposite to the screw head 7. In the following, the outer thread 5 of the thread element, for example the screw 1 made of plastic or the thread bushing 2 made of plastic, is described on the basis of the screw 1. This description also applies to the outer thread of the thread insert 2.

The outer thread 5 is formed on an axial piece 10 of the solid screw shaft 3 or on the radial outer side of a hollow cylindrical thread insert 2 and thus of an axial piece 10 arranged there. It extends parallel to the central axis M of the thread element. The thread turn 6 runs in a plurality of windings 20 around the central axis M. A winding 20 denotes a convolution with an angle of 360° about the central axis M. At least two chip flutes 50 extend parallel to the central axis M along the axial piece 10, wherein, according to a first embodiment, the axial piece 10 has a circular cross-section. According to further embodiments, a plurality of chip flutes 50 is provided, in particular two or four or six or eight chip flutes.

The chip flutes 50 pass through the individual windings 20 of the thread turn 6. The chip flutes 50 may have a radial depth up to a core thickness $D_K$ of the axial piece 10 or deeper. Accordingly, the windings 20 are completely missing in the area of the chip flutes 50. Furthermore, the chip flutes 50 may comprise a width $b_{SN}$ in the circumferential direction of the thread element in the range of 0.5 mm≤$b_{SN}$≤5 mm, preferably $b_{SN}$=1.3 mm for a preferred double-edged thread and $b_{SN}$≤3 mm for a four-edged thread. This ensures a sufficiently large space to receive material abraded by the cutting webs 30 and/or the inhibition webs 40 (see below).

The core thickness $D_K$ describes the thickness at the thread base of the screw shaft or the thread insert 2. This is usually referred to as a core diameter of the outer thread 5, provided that it is arranged on a shaft 3 or a thread insert 2 with a circular cross-section according to the first embodiment described above. In the case of the present disclosure, it may be preferred to form the shaft of the screw 1 or the outer side of the thread insert 2 as an orbiform curve which has convex side areas in cross-section and is defined as a Reuleaux polygon. The configuration of cutting 30 and inhibition webs 40 explained in more detail below can be realized on this basic structure with a cross-section of the same thickness in the same way as on an axial piece 10 being circular in cross-section.

Figure 2:
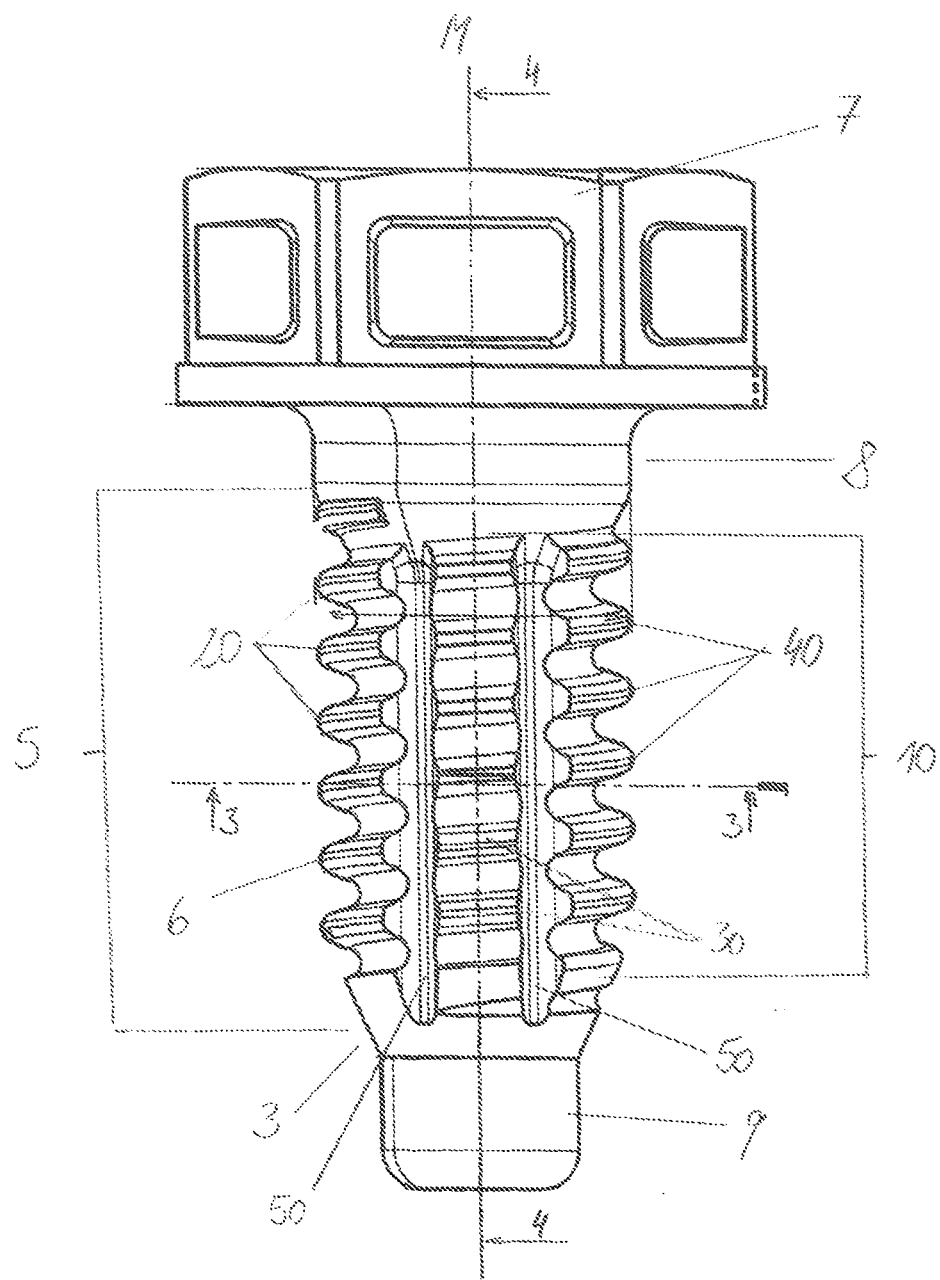
FIG. 2 is a side view of the screw from FIG. 1A.
Figure 2:
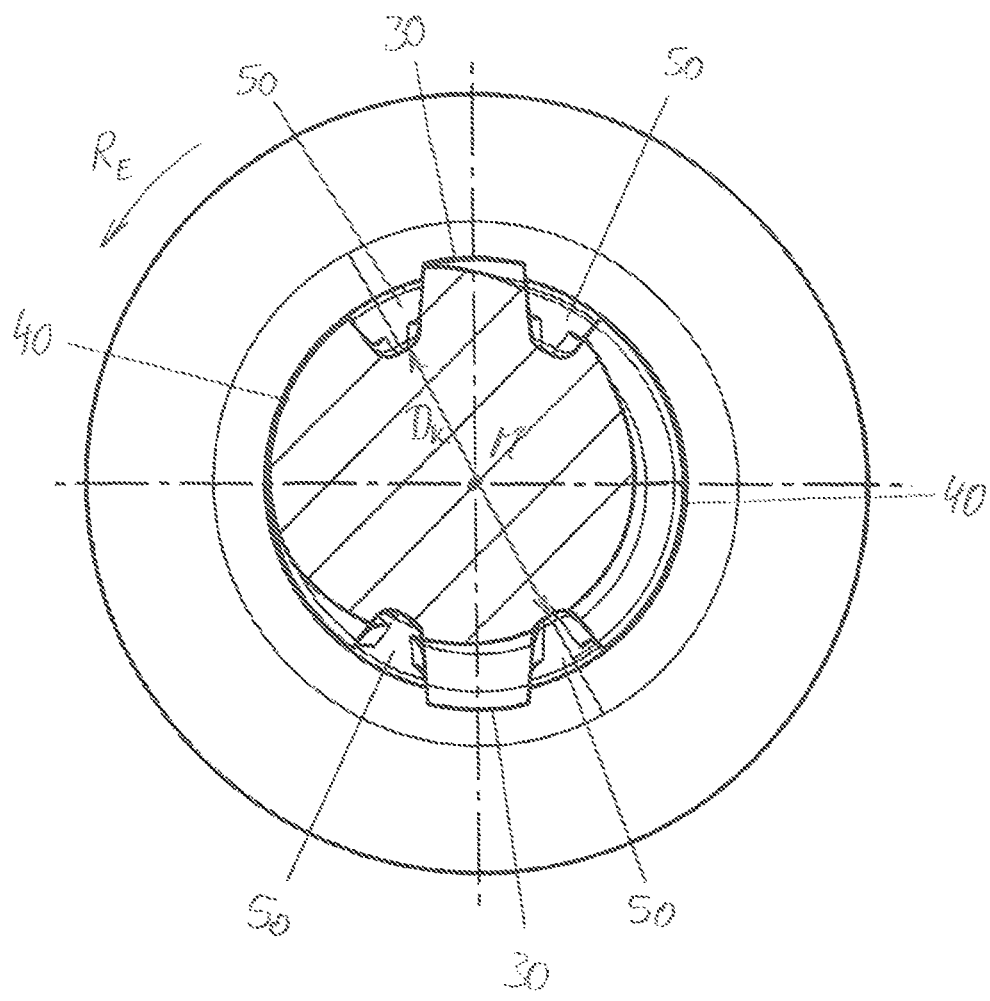

The chip flutes 50 subdivide the plurality of windings 20 in the axial piece 10 into a plurality of axially spaced, section-wise circumferentially arranged and in axial direction consecutive cutting webs 30 and into a plurality of axially spaced and in axial direction consecutive inhibition webs 40 (see FIG. 2). Since four chip flutes 50 are provided in the embodiment of FIGS. 2 to 4, the outer thread 5 may comprise two times a plurality of cutting webs 30 and inhibition webs 40 opposing one another in pairs. It may be preferred to distribute the chip flutes 50 to any circumference, so that the arrangement of the cutting 30 and inhibition webs 40 is not symmetrical.

As can be seen from the radial sectional image in FIG. 3, a radial extension of the cutting web 30 is greater than a radial extension of the inhibition web 40 in the same winding 20. The cutting web 30 may extend in the radial direction by a length in the range from 0.1 to 1.0 mm beyond the radial extension of the inhibition web 40. According to a further embodiment, the cutting web projects 0.35 mm per side in the radial direction beyond the inhibition web. The projection length of the cutting web may also increases with an increasing diameter of the thread element.

Figure 5:
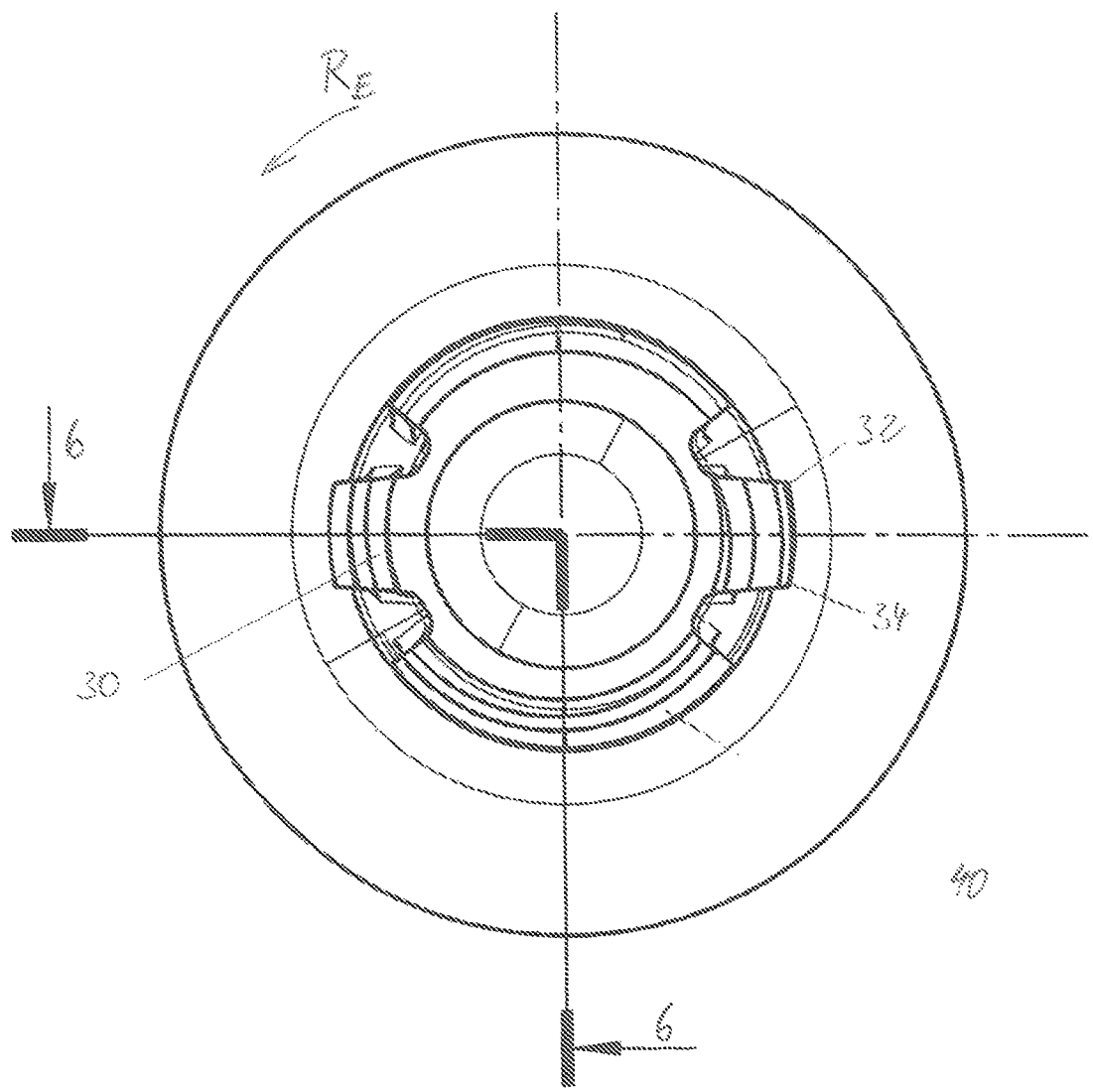
FIG. 5 is a bottom view of the plastic screw according to FIG. 2.

According to a further embodiment, the cutting web 30 is provided with a starting point 32 and an end point 34 when viewed in the screwing-in direction $R_E$ (see FIG. 5). In order to increase the cutting effect during screwing-in and the inhibition during screwing-out of the thread element by the cutting web 30, the radial extension of the cutting web 30 is greater at the starting point 32 than at the end point 34. Such a configuration can also preferably be used with the inhibition web 40.

Figure 4:
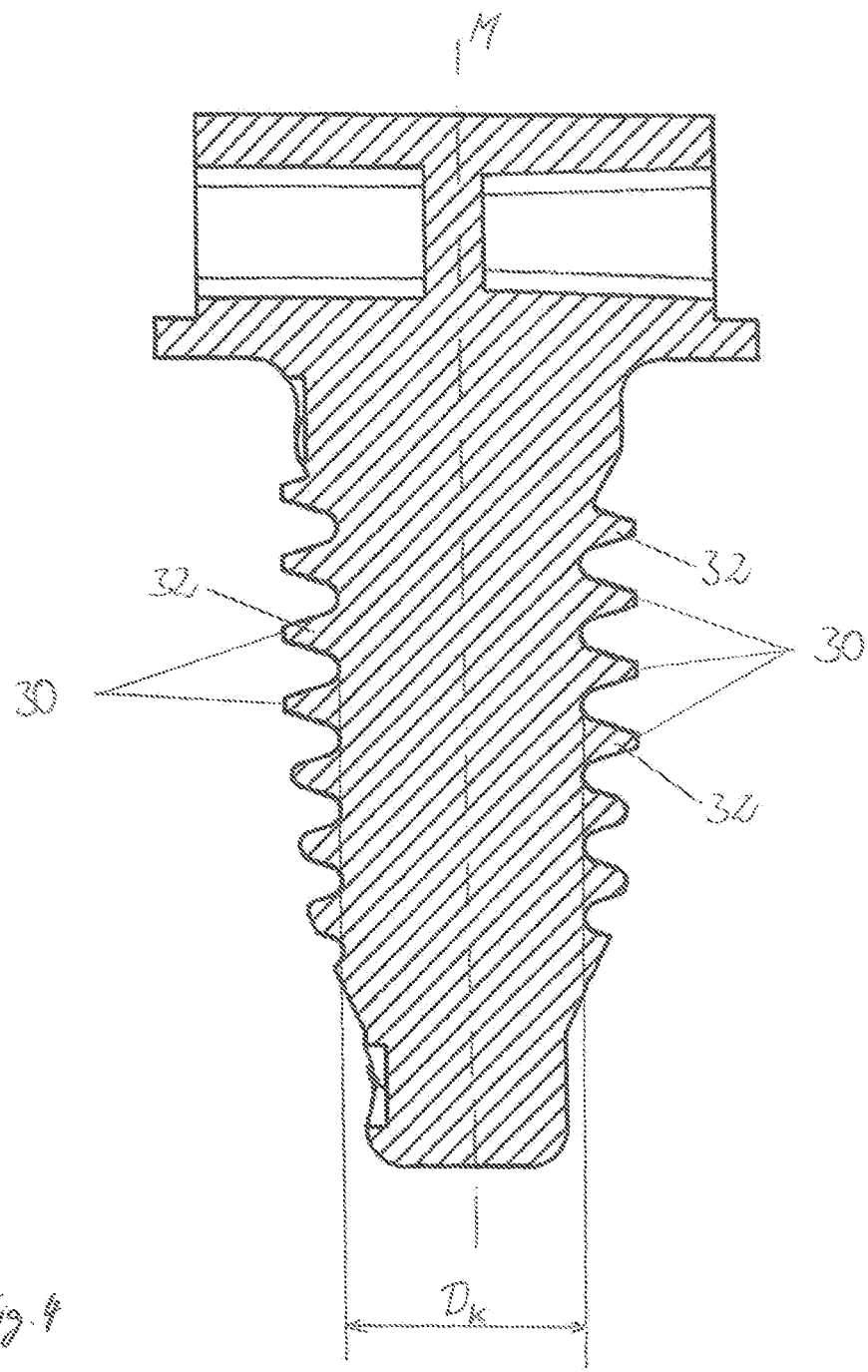
FIG. 4 is an axial sectional view of an embodiment of the screw according to FIG. 2 along the line 4-4.
Figure 6:
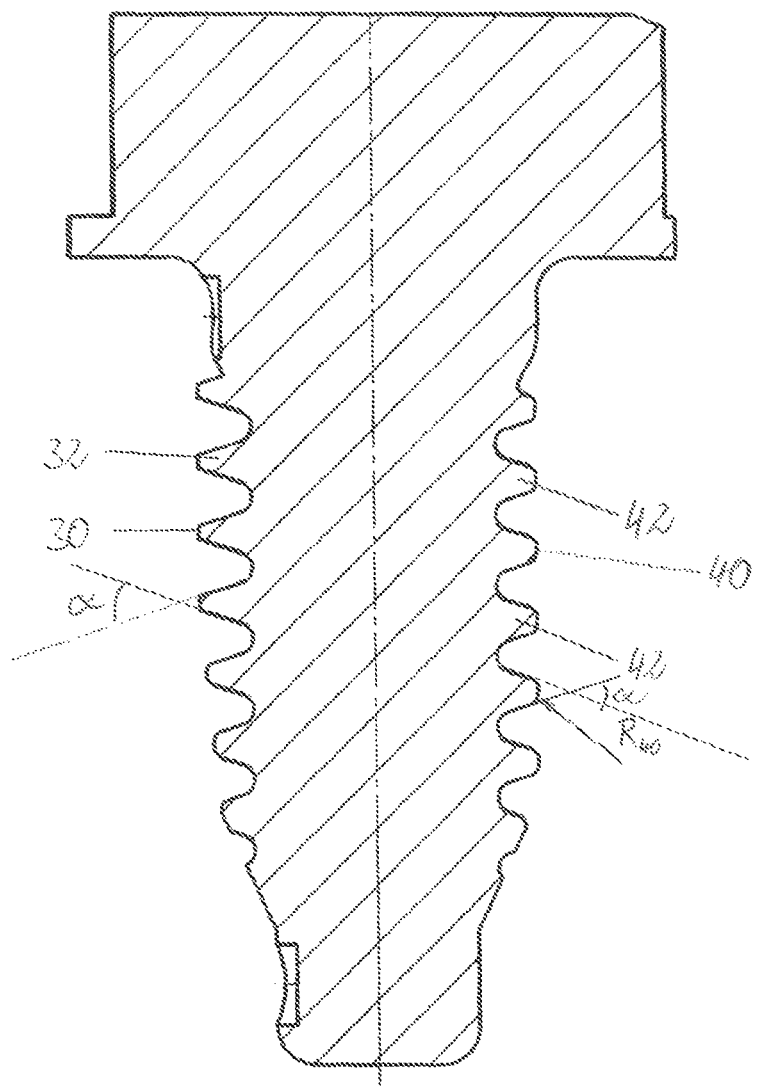
FIG. 6 is an axial sectional view along the line 6-6 from FIG. 5.

Regarding the end faces 32 of the cutting webs 30 in the axial sectional images of FIGS. 4 and 6 as well as the end faces 42 of the inhibition webs 40 in the axial section of FIG. 6, it can be seen that the radial outer side of the cutting webs 30 may be formed with sharp edges. For this purpose, the cutting web 30 is tapered radially on the outer side to a tip (not shown). According to another embodiment, the cutting web 30 is flattened radially on the outer side, as shown in FIGS. 4 and 6. This sharp-edged shape of the radial outer side of the cutting webs 30 supports the cutting effect of the cutting webs 30 in the plastic of the support part when the counter-thread is created. It may be further preferred to form the cutting webs 30 as well as the inhibition webs 40 rounded at the radial outer side when viewed in the axial sectional view. The inhibition webs 40 may be rounded with a radius $R_{40}$=0.25 mm. The radius may be in a range of 0.05 mm≤$R_{40}$≤0.4 mm. The cutting webs 30 may use the same radius or a flattening extending parallel to the central axis M or an infinite radius.

In the axial section, the flanks of the cutting webs 30 and of the inhibition webs 40 may include an angle in the range of 30°≤∝≤40°, preferably ∝=35° (see FIG. 6). It may be also preferred to form the cutting webs 30 with a larger flank angle ∝ than the inhibition webs 40. This supports and enhances the mechanical stresses between the formed counter-thread and the flanks of the inhibition webs 40, so that the inhibiting effect on the rotation of the thread element is increased.

Based on the geometry of the cutting webs 30 and the inhibition webs 40 described above, it is apparent that the cutting webs 30 act as cutting edges in the plastic of the support part in the screwing-in direction $R_E$. If the thread element is turned in the screwing-out direction $R_A$, the cutting webs 30 have an inhibiting effect on the rotational movement due to their radial extension and the sharp-edged geometry. The compression webs 40 may have an elastically pressing effect in the pre-grooved coils of the counter-thread of the support part. In this way, they create an inhibiting effect in relation to the rotation of the thread element, both in the screwing-in direction $R_E$ and the screwing-out direction $R_A$.

Subdividing the axial piece 10 into such webs 30, 40 over the entire length or over a part of the length of the outer thread 5 has a number of reasons. Due to the construction of the outer thread 5, a cutting web 30 may be always followed by an inhibiting inhibition web 40 and then a cutting web 30, etc. This alternation may support the creation of the counter-thread in the same way as a reliable support of the outer thread 5 by press fit in the support part. By means of the specifically arrangeable number and position of the cutting webs 30 and the inhibition webs 40, force engagement points on the outer thread 5 are specifically distributed during the screwing-in and screwing-out of the thread element into the support part. Since these force engagement points determine the torsional moment acting on the thread element in size and axial distribution, the mechanical load of the thread element can be specifically adjusted via the arrangement of the cutting webs 30 and the inhibition webs 40. In addition, it may be preferred to vary the axial piece 10 with cutting webs 30 and inhibition webs 40 in its length, to divide it into different length sections and/or to arrange only one or more axial pieces 10 specifically relative to the length of the outer thread 5 at different axial positions. In this way, the thread element is adapted to a plastic of the support part and its material properties and/or to a geometry of the receiving opening for the thread element in the support part and/or to a plurality of support parts which are to be connected with only one thread element.

The thread element is made of a high-performance plastic with preferred high temperature resistance, high rigidity and high strength with low water absorption. With regard to the extent of these properties, there must be the greatest possible disparity from that of the plastic of the support part in order to achieve the desired form stability in the thread profile and in the cutting geometry for the cutability or formability for forming the counter-thread in the support part. High-performance plastics for the thread element may include polyphthalamide GF (PPA GF); copolyamide based on polyphthalamide GF; polyetherimide GF (PEI GF); polyetheretherketone GF (PEEK GF) and polyphenylene sulfide (PPS). The following materials can also be considered: polyamide—high glass filled; polyphthalamide—carbon fiber reinforced; polyphthalamide—carbon fiber reinforced and glass fiber reinforced; copolyamide based on polyphthalamide—carbon fiber reinforced; copolyamide based on polyphthalamide-carbon fiber reinforced and glass fiber reinforced; duromer plastics. It is understood that these are only examples for the material of the thread element, thus, other thermal high-performance plastics can also be used.

In order to create a connection assembly with at least one support part made of plastic and an above-mentioned thread element made of plastic, the following steps are required: axially screwing-in the thread element into the receiving opening in step S1, thereby forming a counter-thread in an inner wall of the receiving opening by means of a plurality of cutting webs 30 in the outer thread in step S2, removing material abrasion via the chip flutes which occurs during forming of the thread in step S3 and creating a press fit in the formed counter-thread by engagement of a plurality of inhibition webs which have a smaller radial extension than the cutting webs and which are arranged separately to the cutting webs via a plurality of chip flutes in step S4.

Figure 7:
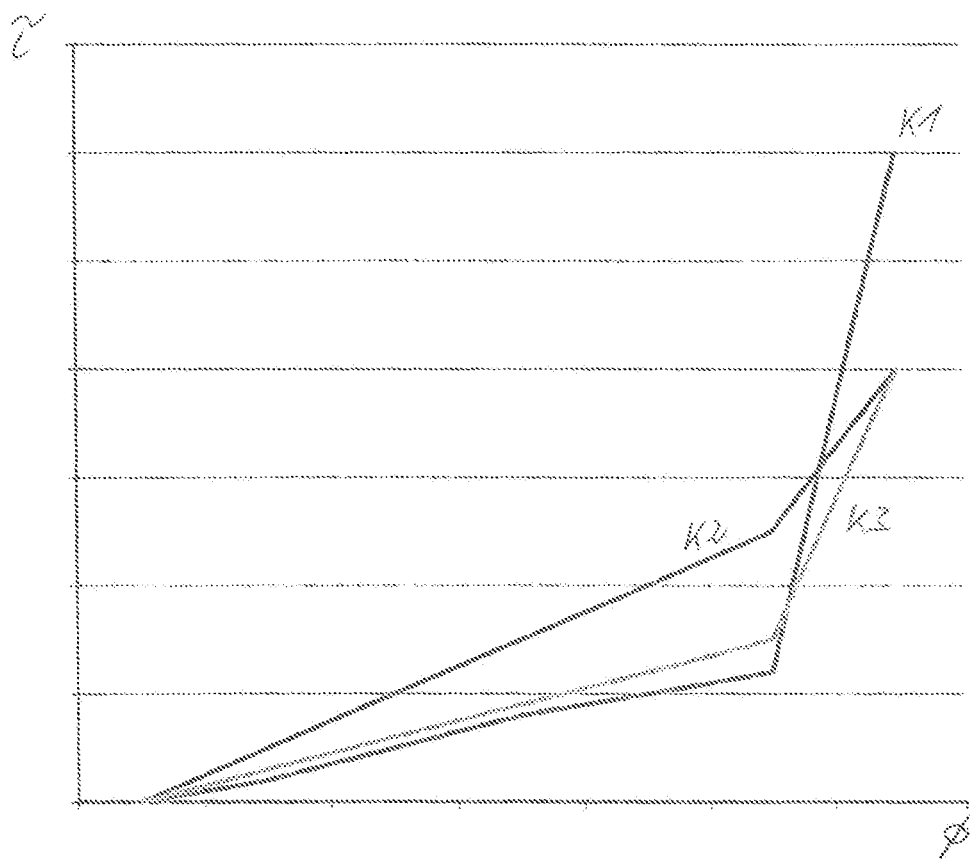
FIG. 7 is a torque chart with torque characteristics for screwing in the thread-forming plastic screw or the thread-forming thread element.
Figure 8:
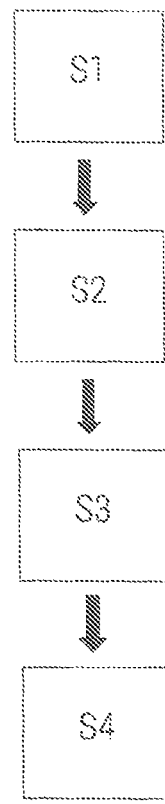
FIG. 8 is a flow chart of an embodiment of the connection method.
Figure 9:
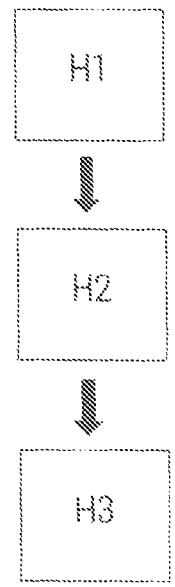
FIG. 9 is a flow chart of an embodiment of the manufacturing method of the thread element.

With reference to FIG. 7, torque curves $K_1$ to $K_3$ are shown which characterize the screwing-in of a thread element, in this example a screw, into a support part. Curve $K_1$ describes the torque in dependence on the rotation angle of the thread element with metric thread in a metal-metal connection. Due to the low friction during the screwing-in process, the curve runs relatively flat. In the area of the rise jump of curve $K_1$, the head of the thread element is abutted on the support part (head abutment). The area between the head contact and the fracture torque of the thread element in the maximum of curve $K_1$ is relatively large due to the stability of the metal. Curve $K_2$ describes the screwing-in of a thread element made of plastic with the self-forming thread according to DE 10 2004 021 484 A1. Due to an increased torque in the area of the head abutment and a lower fracture torque compared to the metric thread of the metal-metal connection of curve $K_1$, the prior art self-forming thread demonstrates a limited practical applicability. Curve $K_3$ characterizes an embodiment of the present invention. Due to the form of the self-forming thread, the torque has been reduced up to the head abutment. At the same time, the range of the tightening torque of the screw, that is, the range between head abutment and fracture torque, has been increased. As a result, the thread element can be tightened with a lower probability of failure compared to the prior art.

The thread element may be manufactured by injection molding. For this, the following steps are provided: In a first step (H1), an injection mold is provided, which is formed complementary to the thread element. The thread element may comprise the form of one of the above-mentioned embodiments, which determines the corresponding design of the injection mold. In a subsequent step, the thread element is injection molded (step H2) and is then demolded from the injection mold (step H3).

The invention claimed is:

1. A thread element made of plastic comprising an axial piece having a central axis and a thread turn of an outer thread circulating around the central axis in several windings, wherein the outer thread is adapted to form a counter-thread when being screwed into a receiving opening of a support part made of plastic, wherein
   a plurality of adjacent windings are interrupted at least over a part region of the axial piece by at least two chip flutes extending parallel to the central axis, to form a plurality of axially spaced and in axial direction consecutive cutting webs in the plurality of adjacent interrupted windings, wherein
   a radial extension of the cutting web is greater than a radial extension of the interrupted windings.

2. The thread element according to claim 1, in which the radial extension of the cutting web is 0.1 to 0.5 mm greater than the radial extension of an inhibition web of the winding.

3. The thread element according to claim 2, the cutting web of which has a circumferential extension with a starting point and an end point viewed in the direction of insertion, wherein the radial extension is equal at the starting point and the end point or wherein the radial extension at the starting point is greater than at the end point.

4. The thread element according to claim 3, in which the cutting web is sharp-edged on its radial outer side.

5. The thread element according to claim 1 comprising one, two or four cutting webs per winding, wherein in the case of more than one cutting web, these are arranged in pairs opposite one another.

6. The thread element according to claim 1, comprising an even number of chip flutes.

7. The thread element according to claim 6 comprising one, two or four cutting webs per winding, wherein in the case of more than one cutting web, these are arranged in pairs opposite one another.

8. The thread element according to claim 1, the chip flutes of which interrupt the windings of the outer thread up to or beyond the core thickness.

9. The thread element according to claim 1, in which the interrupted winding comprises an inhibition web being rounded on its radial outer side and having a radial extension smaller than a radial extension of the cutting web.

10. The thread element according to claim 1, which is formed as a plastic screw with a screw head and a screw tip.

11. A connection assembly comprising at least one support part made of plastic and a thread element according to claim 10, which is screwed into a receiving opening of the support part.

12. The thread element according to claim 1, which is formed as a thread bushing with an inner thread or a through-opening.

13. A connection assembly comprising at least one support part made of plastic and a thread element according to claim 12, which is screwed into a receiving opening of the support part.

14. A connection assembly comprising at least one support part made of plastic and a thread element according to claim 1, which is screwed into a receiving opening of the support part.

15. Method for manufacturing a connection assembly comprising at least one support part made of plastic and a thread element made of plastic according to claim 1, the thread element of which has an outer thread and the support part of which has a receiving opening, wherein the method comprises the following steps:
   a. axial screwing-in of the thread element into the receiving opening,
   b. thereby forming a counter-thread in an inner wall of the receiving opening by means of a plurality of cutting webs in the outer thread, and
   c. creating a press fit in the formed counter-thread by engagement of a plurality of interrupted windings which comprise a smaller radial extension than the cutting webs and which are arranged separately from the cutting webs via a plurality of chip flutes.

16. The method according to claim 15 with the further step:

removing material abrasion which occurs during the thread forming via the chip flutes.

17. Method for manufacturing a thread element made of plastic comprising the following steps:

a. providing an injection mold formed complementary to the thread element, wherein the thread element comprises an axial piece having a central axis and a thread turn of an outer thread circulating around the central axis in several windings, and a plurality of adjacent windings are interrupted at least over a part region of the axial piece by at least two chip flutes extending parallel to the central axis, to form a plurality of axially spaced and in axial direction consecutive cutting webs in the plurality of adjacent interrupted windings, wherein a radial extension of the cutting web is greater than a radial extension of the interrupted winding, b. injection molding the thread element and c. demolding the thread element from the injection mold.

* * * * *